Nov. 14, 1944.  E. A. SMITH  2,362,505

WELDING

Filed Dec. 27, 1940

INVENTOR.
EMMETT A. SMITH
BY *Oberlin, Limbach & Day*
ATTORNEYS.

Patented Nov. 14, 1944

2,362,505

UNITED STATES PATENT OFFICE 2,362,505

WELDING

Emmett A. Smith, East Cleveland, Ohio, assignor to The Lincoln Electric Company, Cleveland, Ohio, a corporation of Ohio Application December 27, 1940, Serial No. 371,925

2 Claims. (Cl. 113—111)

This invention relates to the art of welding, and more particularly to improvements in the method of supporting molten weld metal when joining together by welding two pieces of material such as metal plates or the like.

Where it is desired to join together, by welding, adjacent edges of two metallic members, such as metal plates or like articles, it is common practice to apply a backing strip to the underside of the weld seam to support the molten metal therein. The backing strip is operative to hold the molten weld metal in position against gravity whether such molten metal is an added quantity fusion deposited or a part of the work being welded. The backing strips, generally metallic, in commercial use are usually formed of copper or steel and are held in position against the under side of the weld seam by any suitable means such as clamping or tack welding, and may be either left in position or removed after the weld is completed.

One uniform disadvantage of metallic backing strips is that they detrimentally affect the weld metal. Some of the reasons for such detrimental effect may be partially understood, however, no full understanding is had of all of the detrimental influences which metallic backing strips have been observed to have on the weld metal.

To avoid these disadvantages incident to the use of metallic backing strips, the substitution of refractory materials having a lower coefficient of heat transfer than the metals customarily used has been proposed. One notable example of such is the proposal in Patent No. 2,145,009 to use a relatively thick body granular refractory material held in place by a metallic trough. However, none of these proposals have been entirely satisfactory, capable of success from a commercial standpoint for reasons which are quite obvious.

One of the principal objects of this invention is to provide an improvement in the construction of the backing strip for supporting the weld metal which may be conveniently and economically carried out in commercial practice.

A further object is to provide an improvement in the means of supporting the molten weld metal by insulating the same from the backing strip.

A further object is to provide an improved means of supporting the molten weld metal by means of cooperating respectively metallic and non-metallic elements, both of which are flexible and thus readily applied to the work with the non-metallic element arranged to have direct contact with the molten weld metal.

A further object is to provide an improved means of supporting the weld metal which involves the employment of a metallic backing strip on the supporting surface of which is placed a strip of fiber glass or like material for the purpose of insulating the weld metal from the metallic portion of the backing strip.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

Figure 1:
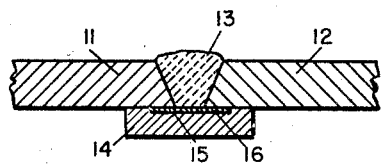
Fig. 1 is a sectional view illustrating the construction and the manner of application of a backing strip constructed in accordance with the principles of this invention.

Referring to the drawing, the numerals 11 and 12 indicate adjacent edge portions of work pieces such as metal plates joined together by weld metal 13. In order to prevent the weld metal from dropping through the seam, a backing strip 14 is applied to the under surface of the seam prior to the beginning of the welding operation. The backing strip 14 may be held in position against the under side of the seam by any suitable method such as clamping or tack welding. After thus positioning the backing strip 14, the work pieces 11 and 12 are joined. The actual process used for depositing the weld metal 13 may be any suitable for the purpose. A carbon arc, a metallic arc, or an arc submerged in a so-called heavy flux may be used.

As pointed out heretofore, it has been customary to make the backing strip 14 entirely of metal. This has been attended by many difficulties. In order to prevent such difficulties, the backing strip 14, in the embodiment of this invention illustrated in Fig. 1, is provided with a groove 15, on its work contacting face. In such groove 15 is placed a relatively thin strip of coherent, flexible, non-metallic material 16, such as fiber glass tape. The groove 15 is relatively shallow and the material 16 is correspondingly thin, the showing in the drawing being exaggerated with respect to the relative thickness of the material 16 for the purpose of illustration only. In practice, it has been found that one to four layers of fiber glass tape each having a thickness up to .025 inch is satisfactory for backing up the seam between work parts having a thickness of up to about one-half inch.

In place of the fiber glass tape, which may be readily purchased on the market, it is contemplated that any form of glass-like material which has been processed into a fibrous form, such as glass wool, yarn, cloth, braided tubing, etc., may be employed as the material 16. It is also contemplated that any other coherent, flexible, non-metallic material, such as the form of silicates known as asbestos fiber, may be used in the groove 15, the only other limitation on the material 16 being that it will not give off harmful gases, vapors, etc., at temperatures to which the material is raised during the welding process. Other materials known as "rock wool" and fibrous formations of slags resulting from the making of iron and steel, may likewise be used.

In operation, a strip of material such as 16 is placed in the groove 15 and the backing strip is then applied to the under surface of the seam to be welded. The parts 11 and 12 are then joined together by fusion depositing the weld metal 13 or by other suitable welding processes. The molten weld metal 13 is prevented from immediately contacting the backing strip 14 by the fibrous glass tape 16. In this manner, the immediate or direct deposit of the weld metal onto the backing strip 14 is prevented, with consequent avoidance of deterioration of the weld connection. The heat of the molten weld metal will fuse at least a portion of the glass tape, and after a welding operation the backing strip 14 may be removed and the groove 15 cleaned out in order that a new strip of fiber glass tape 16 may be inserted for a subsequent welding operation.

Figure 2:
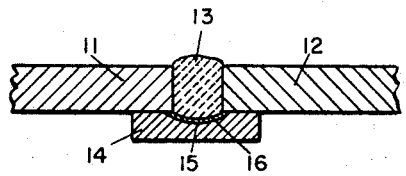
Figs. 2, 3 and 4 are views similar to Fig. 1, respectively illustrating modified constructions and applications of the backing strip of this invention.
Figure 3:
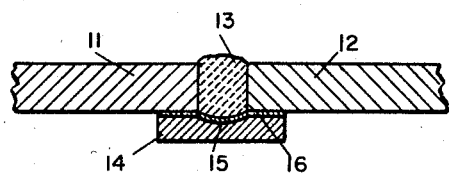
Figure 4:
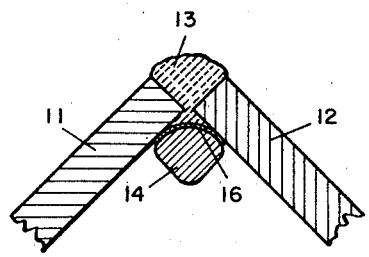

The work engaging face of the backing strip 14 may be only partially defined by the fiber glass tape 16, as in the case of the modifications shown in Figs. 1 and 2, or may be entirely defined by the fibrous glass tape as in the case of the modifications shown in Figs. 3 and 4. However, in all modifications it will be noted that the contour of the work engaging face of the backing strip 14, whether defined entirely or partially by the fiber glass tape 16, is substantially the same as in conventional practice wherein the backing strip 14 is formed entirely of metal. In all cases the fiber glass tape 16, or other suitable material, will be of sufficient width to maintain the weld metal 13 out of immediate or direct engagement with the supporting strip 14 for the purpose of restricting the transfer of heat through the backing strip 14 during a welding operation.

In the modification shown in Figs. 2 and 3, the groove 15 is curved outwardly of the plane of the under surfaces of the plate 11 and 12, and such curvature permits the formation of a weld bead on the under side of the weld which will reinforce the connection. In this case the groove 15, in addition to its function in positioning the strip 16, is operative to shape the weld bead while operating to support the weld metal. In the modification shown in Fig. 1, the groove 15 is formed so that the upper surface of the strip 16 will be in the plane of the remainder of the work contacting face of the backing strip 14. Although in this case no appreciable bead is formed on the underside of the weld, the groove 15 and strip 16 is likewise operative to shape and support the weld metal.

From the foregoing, it will be apparent that the backing member 14 together with the strip 16 functions to shape and support the weld metal in the same manner as conventional solid metallic backing strips while, at the same time, avoiding the disadvantages of such backing strips. The provisions of the strip 16, by maintaining the weld metal out of immediate or direct contact with the backing strip 14, restricts the transfer of heat from the weld metal to the backing strip 14. Moreover, this advantage is gained without any substantial sacrifice of speed or cost of the welding operation as compared to conventional methods employing a solid backing member 14.

While a number of different materials have been indicated as satisfactory for use as the restricting medium in my composite backing strip, it will, nevertheless, be observed that all of such have the common property of being coherent, flexible and non-metallic and which will not give off any substantial amount of gas or vapor up to the temperature encountered in use. It will thus be seen that composite backing strips may be readily built up to conform to any condition encountered in usual welding practices. Thus, for example, if flat plates are being welded, a flat metallic backing member is employed in conjunction with the previously identified type of restricting material. My improved backing strip will be found of great utility in backing up the seams on irregular work. The flexible nature of the refractory material, and the flexible nature of the metallic support by which it is carried, enables the operator to make the backing strip conform to the irregular contour of the work. Likewise, when welding tubular articles, a metallic annulus may be employed as the supporting means for the restricting material, and the latter then wrapped around such annulus where it will be, by the very nature of its form, held securely in position until the composite annulus is inserted in place within the article to be welded.

The requirement that the restricting material be coherent in its normal state is a real limitation. By having the material coherent, it will remain in place uneffected by the physical disturbance created by the welding arc. In this way, a very thin layer of restricting material may be employed as compared with the very considerably greater amount of unbonded material which would be necessary to accomplish the desired result.

From the foregoing description, it will be observed that the restricting material which forms a component part of the improved backing strip of my invention is distinguishable over the prior art practices in accordance with the following particulars:

Wherever a non-metallic material has been used as the means on which the weld metal in the seam is deposited, such material has been, in itself, relied upon to shape the contour of the bead. When the non-metallic material has been a thick, inflexible bonded article, such as a thick block of refractory material, the contour of the bead formed of the weld metal on the surface thereof is shaped to conform to such surface to the same extent as would result from the direct engagement of a metallic strip with the weld metal. The surface of any such refractory article changes rapidly, however, if repeatedly used.

Where substantial quantities of unbonded refractory material have been employed, as for example in the teachings of the previously mentioned patent, some of the supporting material has been fused, and due to the thickness of the layer employed, local irregularities have occurred, resulting from uneven application of heat by the welding arc; uneven rate of deposit of the fused weld metal; variations in spacing of the work pieces; or variations in the pressure by which the unbonded material is forced against the work. In the composite backing strip of my invention, however, the non-metallic material serves the purpose of restricting the heat transfer between the molten weld metal and the metallic backing strip sufficiently so as to overcome the detrimental influence of the metallic backing strip, were it permitted to come into immediate and direct contact with the weld metal, while at the same time utilizing the accurately shaped contour of the metallic portion of the composite strip to control the contour of the bead. This advantage results not only from the type of material employed but is likewise a direct function of the relative thinness of the layer of restricting material utilized.

The method or process of fusion welding involved in the foregoing disclosure forms the subject matter of my divisional application filed May 13, 1943, Serial No. 486,909.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. In a backing device for closing and forming the under side of a seam in fusion welding, the combination of a metallic backing strip having a surface of substantially the same shape as the surface of the weld desired, and a replaceable layer in the form of a coherent flexible fibrous glass tape of substantially uniform thickness, but relatively thin compared with the thickness of said strip, substantially covering such surface of said strip, the material of said layer being fusible at welding temperature and substantially free from substances capable of evolving gases at such temperature and said strip having means to limit the lateral flow of such material despite fused condition thereof.

2. In a backing device for closing and forming the under side of a seam in fusion welding, the combination of a metallic backing strip having a depressed area providing a surface of substantially the same shape as the surface of the weld desired, and a replaceable layer of approximately uniform thickness, but relatively thin compared with the thickness of said strip, substantially covering such surface of said strip, said layer comprising a flexible, coherent, fibrous glass material fusible at welding temperature and substantially free from substances capable of evolving gases at such temperature.

EMMETT A. SMITH.